United States Patent [19]
Ceccon

[11] 3,839,792
[45] Oct. 8, 1974

[54] EGG SHELL CUTTING DEVICE

[76] Inventor: J. Paul Ceccon, 707 Dorian Rd., Westfield, N.J. 07090

[22] Filed: Feb. 22, 1974

[21] Appl. No.: 444,731

[52] U.S. Cl.................. 30/120.1, 30/124, 30/310
[51] Int. Cl............................................ B26b 27/00
[58] Field of Search .......... 30/120.1, 124, 290, 310

[56] References Cited
UNITED STATES PATENTS

| | | | |
|---|---|---|---|
| 691,389 | 1/1902 | Kendrick | 30/120.1 |
| 1,030,324 | 6/1912 | Pender | 30/120.1 |
| 1,199,114 | 9/1916 | Robertson | 30/120.1 |
| 1,491,908 | 4/1924 | Greig | 30/120.1 |
| 2,548,667 | 4/1951 | Gruss | 30/120.1 |
| 2,760,538 | 8/1956 | Palmieri et al. | 30/120.1 |
| 2,798,521 | 7/1957 | Bourque | 30/120.1 |
| 3,090,413 | 5/1963 | Rossi | 30/120.1 |

*Primary Examiner*—Al Lawrence Smith
*Assistant Examiner*—J. T. Zatarga

[57] ABSTRACT

Egg shell cutting device comprises a suction cup having a convex surface for contacting the egg shell and a header having a ferrule-type retainer therein; a finger support having a cavity therein and a finger-resting surface thereon; a longitudinal shaft having a first and a second terminals and rotatably positioned intermediate said suction cup and said finger support; said first terminal being securely retained within said ferrule of said header, and said second terminal being securely retained within said cavity of said finger support; a flexible, resilient, arcuate arm having one end thereof connected to said shaft and slidable along the longitudinal axis thereof; means for retaining said one end of said arm positioned on said shaft; and, cutting means located at the free end of said arm opposite said one end for cutting the egg shell.

2 Claims, 2 Drawing Figures

EGG SHELL CUTTING DEVICE

FIELD OF THE INVENTION

The present invention is generally related to devices for opening eggs and, more particularly, to an improved, very versatile device for cutting an egg shell into two distinct portions without fragmentation of the shell or damage to its contents.

DISCUSSION OF THE PRIOR ART

Egg opening devices are well known, but their popularity is somewhat limited because of the lack of versatility required in this type of devices by the user. For example, heretofore, there has never been available an egg opener which, concurrently, was usable directly with any conventional egg cup, could be adjusted to different-size eggs, was capable of either opening the egg at mid-section or severing a minor top portion thereof, was resiliently applicable to shells having different thickness or structure, was simple in construction, economical and operationally uncomplicated.

Devices are known which require the closing of separate egg containers, the tightening of screws, the squeezing of spring-loaded handles, the utilization of special egg containers, the rotating of blades, and the like; but none of them has the concurrent characteristics mentioned hereabove which is truly indicative of a most versatile instrument. One common disadvantage of many known devices is that once the egg shell is opened, the tool cannot be passed on to another user, because it is an integral part of the egg receptacle being used. Another drawback resides in either the complexity of the device or in the need for a complete set of egg-opening devices, because of the fragility thereof caused by their pottery construction. Other devices are indeed usable with conventional egg cups, but nevertheless lack in versatility: for example, U.S. Pat. No. 1,491,908 to Greig shows a device for the removal of egg shells which must be handled manually thus subjecting the fingers of the user to the often high heat of the shell; the device, further, cannot cut the shell at more than one designated plane and requires the unsanitary piercing of the shell with ensuing penetration of a steel or metallic nail-like member into the edible egg. Another example is U.S. Pat. No. 3,090,413 to Rossi, which discloses an egg top remover admirably suitable for certain types of operations, but lacking nevertheless sufficient versatility: for instance, it has limited adaptability to variations in egg sizes or cutting planes and prevents the visual observation of completion of the cutting operation, because the cutting edge is hidden by a skirt member covering the egg.

SUMMARY OF THE INVENTION

It is, therefore an object of the present invention to provide a device for opening eggs without fragmentation of the shell or damage to its contents, which is usable directly with any conventional egg cup, adjusts to different egg sizes and cuts on different planes, is simple in construction and operation and is economical to manufacture.

Briefly stated, the device of the invention comprises a suction cup of rubber or like material with a ferrule therein to accommodate one terminal of a rotatable preferably cylindrical shaft, a finger support with a cavity therein to accommodate the other terminal of the shaft and an intermediate, resilient and preferably slidable arm with a cutting edge at the free-extremity thereof. If desired the slidable arm can be displaced axially above the shaft's longitudinal axis to select the cutting plane for the edge of the arm.

THE DRAWINGS

This and other objects and advantages of the invention will be more readily understood by reference to the accompanying drawings, which are merely illustrative and not limitative of the invention, and in which:

FIG. 1 is a perspective, partially cross-sectional view of the preferred embodiment of the invention; and FIG. 2 is a detailed perspective variant of the shaft of the device.

DETAILED DESCRIPTION OF THE INVENTION

Figure 1:
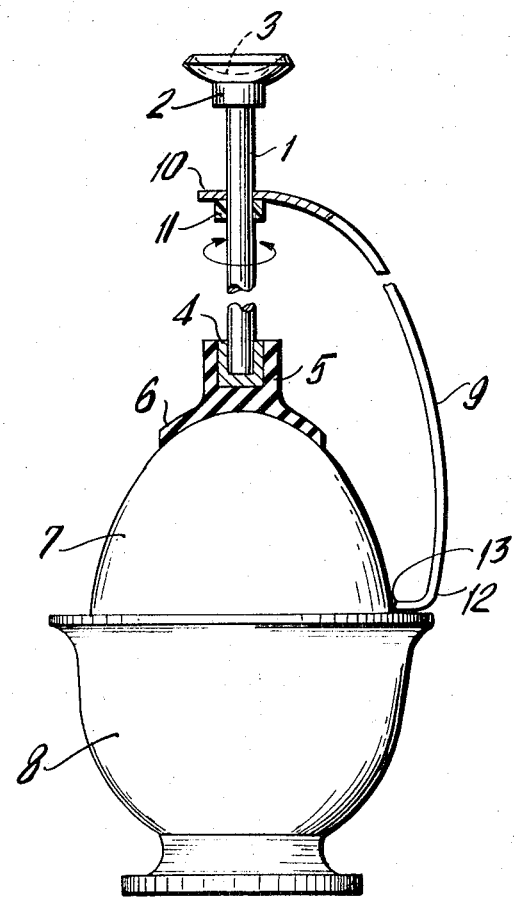
Figure 2:
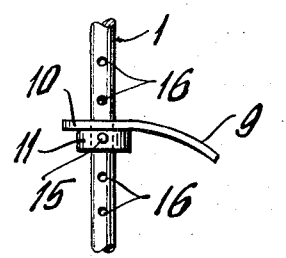

Referring now to the accompanying drawings the egg opener of the present invention comprises a cylindrical shaft 1 of suitable diameter and length and rotatable about its longitudinal axis as clearly indicated by the arrow. The upper extremity or terminal of the shaft is seated within a cavity (not shown) of a finger support 2 which is provided also with an upper concave surface 3 upon which the extremity of a finger can comfortably rest. The shaft's upper terminal is rotatably but securely retained within the cavity in a manner well known in the art. The lower terminal of shaft 1 is rotatably but securely retained, in a similar manner, within a ferrule 4 of metallic or other suitable material provided in the header 5 of suction cup 6. Suction cup 6 is made preferably of rubber or equivalent material and is provided with the conventional convex surface for suction-attachment to the egg shell surface.

The shaft is preferably cylindrical in cross-section, for ease of manufacture and for economic reasons. It is, however understood that its terminals could be of different cross-sectional shape in order to facilitate their retainment in both cavity and ferrule, or alternatively, the terminals of the shaft could be cross-sectionally circular while the shaft intermediate thereto could be cross-sectionally of other non-circular configuration.

As it can be readily seen from the accompanying drawing, suction cup 6 is applied to the egg 7 while resting within any conventional egg cup 8. Intermediate the two terminals of shaft 1 there is connected one end 10 of a flexible and resilient arm 9. This end 10 is preferably not rotatable with respect to shaft 1 and is furthermore slidably adjustable along the longitudinal axis of shaft 1.

Alternatively, the end 10 of arm 9 could be rotatable about the longitudinal axis of the shaft, while the shaft can be made rigid and non-rotatable. However, this configuration is less preferred because the rotation of the arm 9 would after repeated use cause a weakening in the slidability characteristic of the arm due to wearing of the collar inner surface 11 of the end 10 of the arm 9. The independence of rotation may be effected by having the inner diameter of the end 10 of arm 9 slightly greater than the outer diameter of the shaft 1.

The sliding effect of end 10 along the longitudinal axis of shaft 1 is achieved by providing the end 10 with a collar 11 with inner diameter substantially equal to the outer diameter of the shaft and of material which is somewhat resilient and frictionable.

Another way of achieving the desired sliding effect of the end 10 is to provide the shaft 1 with a plurality of openings 16 at various distances along the long axis thereof and to provide the collar 11 with a spring-actuated pin 15 which can be inserted into anyone of said openings for retention therein. The arm 9 is suitably arcuate and flexibly resilient upon pressing thereon and is made preferably of stainless steel or equivalent non-rusting material. The other end 12 of arm 9 presents a sharp inwardly directed bend so that the cutting edge 13, with which it is provided, is facing the shell of egg 7 at the most suitable and operationally concurrent angle.

The cutting edge, made of durable suitable metal, may be, for example, a biased blade, a pointed awl-like tool or it may present any other suitable configuration.

In operation: assuming, as an example, that the egg is to be cut at mid-section so as to permit the user to freely discharge the contents in the egg cup, suction cup 6 is applied to the larger end of egg 7, suction end 10 of arm 9 is lowered so that cutting edge 13 rests adjacent to and in planar contact with the edge 14 of egg cup 8, one finger is rested with slight pressure on surface 3 of the finger support 2 and the arm 9 is rotated till the cutting is completed. The entire operation is completely visible; the degree of penetration of edge 13 is correctable by varying the pressure exerted on arm 9 at will.

Furthermore, the edge 14 of the egg cup serves as a reliable guide for simplicity of operation. In the event that the egg is to be cut instead on a different plane, in order to enable the user to eat the egg directly from the shell, collar 11 and end 10 of the arm 9 are displaced upwardly till the cutting edge 13 reaches the desired cutting plane. Only a slight degree of force is needed to slide the terminal 10 of the arm to the desired position on the shaft. Conversely, the pin 15 provided in collar 11 may be inserted in an upper suitable hole 16 in the shaft. It is to be understood that different materials are suitably usable for the different members of the device, all of these materials being within the knowledge of the expert in the art. Similarly, other modifications and alterations are possible without nevertheless exiting from the scope of the invention as described and claimed.

What I claim and wish to secure by Letters Patent of the United States is:

1. Egg shell cutting device comprising:
   a. a suction cup having a convex surface for contacting the egg shell and a header having a ferrule-type retainer therein;
   b. a finger support having a cavity therein and a finger-resting surface thereon;
   c. a longitudinal shaft having a first and a second terminals and rotatably positioned intermediate said suction cup and said finger support;
      i. said first terminal being securely retained within said ferrule of said header, and
      ii. said second terminal being securely retained within said cavity of said finger support;
   d. a flexible, resilient, arcuate arm having one end thereof connected to said shaft and slidable along the longitudinal axis thereof;
   e. means for retaining said one end of said arm positioned on said shaft; and
   f. cutting means located at the free end of said arm opposite said one end for cutting the egg shell.

2. The device of claim 1, wherein said retaining means is a spring-actuated pin and wherein said shaft is provided with a plurality of spaced apertures along the long axis of the shaft for receiving said spring-actuated pin.

* * * * *